United States Patent
Maeda et al.

(10) Patent No.: US 9,689,472 B2
(45) Date of Patent: Jun. 27, 2017

(54) CONTROL DEVICE FOR AUTOMATIC TRANSMISSION

(71) Applicant: AISIN AW CO., LTD., Anjo-shi, Aichi-ken (JP)

(72) Inventors: Takuyo Maeda, Nagoya (JP); Naoya Jinnai, Anjo (JP); Masanori Murakami, Iwakura (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 15/037,487

(22) PCT Filed: Dec. 5, 2014

(86) PCT No.: PCT/JP2014/082197
§ 371 (c)(1),
(2) Date: May 18, 2016

(87) PCT Pub. No.: WO2015/098461
PCT Pub. Date: Jul. 2, 2015

(65) Prior Publication Data
US 2016/0298735 A1 Oct. 13, 2016

(30) Foreign Application Priority Data
Dec. 26, 2013 (JP) .................................. 2013-270421

(51) Int. Cl.
*F16H 3/62* (2006.01)
*F16H 3/66* (2006.01)
*F16H 61/04* (2006.01)

(52) U.S. Cl.
CPC ............. *F16H 3/663* (2013.01); *F16H 61/04* (2013.01); *F16H 2061/0448* (2013.01); *F16H 2061/0455* (2013.01); *F16H 2200/0069* (2013.01); *F16H 2200/201* (2013.01); *F16H 2200/2023* (2013.01); *F16H 2200/2046* (2013.01)

(58) Field of Classification Search
CPC .. F16H 2061/0448; F16H 3/663; F16H 61/04; F16H 2061/0445; F16H 2200/2046; F16H 2200/2023; F16H 2200/201; F16H 2200/0069
See application file for complete search history.

(56) References Cited

U.S. PATENT DOCUMENTS

| 5,099,718 A | 3/1992 | Asada et al. |
| 8,096,915 B2 | 1/2012 | Wittkopp et al. |
| 8,100,809 B2 * | 1/2012 | Taniguchi ............... F16H 3/663 475/159 |

(Continued)

FOREIGN PATENT DOCUMENTS

| JP | H03-144147 A | 6/1991 |
| JP | 2002-213545 A | 7/2002 |

(Continued)

*Primary Examiner* — Ramya Burgess
*Assistant Examiner* — Lillian Nguyen
(74) *Attorney, Agent, or Firm* — Oliff PLC

(57) ABSTRACT

A power transfer device that includes an automatic transmission that includes a plurality of engagement elements and a speed change gear mechanism capable of establishing a multiplicity of shift speeds by changing a power transfer path by engaging or disengaging the engagement elements; and a control device that is configured to control the automatic transmission.

18 Claims, 10 Drawing Sheets

(56) References Cited

U.S. PATENT DOCUMENTS

| | | | |
|---|---|---|---|
| 2008/0015073 A1* | 1/2008 | Raghavan | B60K 6/365 475/5 |
| 2008/0182705 A1 | 7/2008 | Hart et al. | |
| 2009/0011893 A1 | 1/2009 | Kato et al. | |

FOREIGN PATENT DOCUMENTS

| | | |
|---|---|---|
| JP | 2008-180365 A | 8/2008 |
| JP | 2009-014062 A | 1/2009 |

\* cited by examiner

FIG. 2

|  | C1 | C2 | C3 | C4 | B1 | B2 |
|---|---|---|---|---|---|---|
| Rev |  | ○ | ○ |  |  | ○ |
| P,N |  | ○ |  |  |  | ○ |
| 1st | ○ | ○ |  |  |  | ○ |
| 2nd | ○ |  |  |  | ○ | ○ |
| 3rd |  | ○ |  |  | ○ | ○ |
| 4th |  |  |  | ○ | ○ | ○ |
| 5th |  | ○ |  | ○ | ○ |  |
| 6th | ○ |  |  | ○ | ○ |  |
| 7th | ○ |  | ○ | ○ |  |  |
| 8th |  |  | ○ | ○ | ○ |  |
| 9th | ○ |  | ○ |  | ○ |  |
| 10th |  | ○ | ○ |  | ○ |  |

FIG. 6

| OPERATION CHART | C1 | C2 | C3 | C4 | B1 | B2 |
|---|---|---|---|---|---|---|
| 1st | ○ | ○ | | | | ○ |
| 2nd | ○ | | | | ○ | ○ |
| 3rd | | ○ | | | ○ | ○ |
| 4th | ● | ● | ● | ○ | ● | ○ |
| 5th | | ○ | | ○ | ○ | |
| 6th | ○ | | | ○ | ○ | |
| 7th | ◎ | ◎ | ◎ | ◎ | | |
| 8th | | | ○ | ○ | ○ | |
| 9th | ○ | | ○ | | ○ | |
| 10th | | ○ | ○ | | ○ | |
| Rev | | ○ | ○ | | | ○ |

4TH SPEED CAN BE ESTABLISHED BY ENGAGING ONE OF ELEMENTS WITH BLACK CIRCLE

7TH SPEED CAN BE ESTABLISHED BY ENGAGING THREE (OR FOUR) OF ELEMENTS WITH DOUBLE CIRCLE

FIG. 7

⟨ MAIN PATTERN ⟩

|  |  | C1 | C2 | C3 | C4 | B1 | B2 |
|---|---|---|---|---|---|---|---|
| PRE-SHIFTING | 10th |  | ○ | ○ |  | ○ |  |
| POST-SHIFTING | 7th |  | ○ | ○ | ○ |  |  |

|  | C1 | C2 | C3 | C4 | B1 | B2 |
|---|---|---|---|---|---|---|
| 9th | ○ |  | ○ |  | ○ |  |
| 7th (NORMALLY) | ○ |  | ○ | ○ |  |  |

|  | C1 | C2 | C3 | C4 | B1 | B2 |
|---|---|---|---|---|---|---|
| 8th |  |  | ○ | ○ | ○ |  |
| 7th (NORMALLY) | ○ |  | ○ | ○ |  |  |

|  | C1 | C2 | C3 | C4 | B1 | B2 |
|---|---|---|---|---|---|---|
| 6th | ○ |  |  | ○ | ○ |  |
| 7th (NORMALLY) | ○ |  | ○ | ○ |  |  |

|  | C1 | C2 | C3 | C4 | B1 | B2 |
|---|---|---|---|---|---|---|
| 5th |  | ○ |  | ○ | ○ |  |
| 7th | ○ | ○ |  | ○ |  |  |

|  | C1 | C2 | C3 | C4 | B1 | B2 |
|---|---|---|---|---|---|---|
| 1st | ○ | ○ |  |  |  | ○ |
| 7th | ○ | ○ |  | ○ |  |  |

FIG. 8

⟨ SUB PATTERN ⟩

|      | C1 | C2 | C3 | C4 | B1 | B2 |
|------|----|----|----|----|----|----|
| 10th |    | ○  | ○  |    | ○  |    |
| 7th  | ○  | ○  | ○  |    |    |    |

|      | C1 | C2 | C3 | C4 | B1 | B2 |
|------|----|----|----|----|----|----|
| 9th  | ○  |    | ○  |    | ○  |    |
| 7th  | ○  | ○  | ○  |    |    |    |

|      | C1 | C2 | C3 | C4 | B1 | B2 |
|------|----|----|----|----|----|----|
| 8th  |    |    | ○  | ○  | ○  |    |
| 7th  |    | ○  | ○  | ○  |    |    |

|      | C1 | C2 | C3 | C4 | B1 | B2 |
|------|----|----|----|----|----|----|
| 6th  | ○  |    |    | ○  | ○  |    |
| 7th  | ○  | ○  |    | ○  |    |    |

|      | C1 | C2 | C3 | C4 | B1 | B2 |
|------|----|----|----|----|----|----|
| 5th  |    | ○  |    | ○  | ○  |    |
| 7th  |    | ○  | ○  | ○  |    |    |

|      | C1 | C2 | C3 | C4 | B1 | B2 |
|------|----|----|----|----|----|----|
| 1st  | ○  | ○  |    |    |    | ○  |
| 7th  | ○  | ○  | ○  |    |    |    |

FIG. 9

⟨ MAIN PATTERN ⟩

|  | C1 | C2 | C3 | C4 | B1 | B2 |
|---|---|---|---|---|---|---|
| 8th |  |  | ○ | ○ | ○ |  |
| 4th (NORMALLY) |  |  |  | ○ | ○ | ○ |

|  | C1 | C2 | C3 | C4 | B1 | B2 |
|---|---|---|---|---|---|---|
| 7th | ○ |  | ○ | ○ |  |  |
| 4th | ○ |  |  | ○ |  | ○ |

|  | C1 | C2 | C3 | C4 | B1 | B2 |
|---|---|---|---|---|---|---|
| 6th | ○ |  |  | ○ | ○ |  |
| 4th (NORMALLY) |  |  |  | ○ | ○ | ○ |

|  | C1 | C2 | C3 | C4 | B1 | B2 |
|---|---|---|---|---|---|---|
| 5th |  | ○ |  | ○ | ○ |  |
| 4th (NORMALLY) |  |  |  | ○ | ○ | ○ |

|  | C1 | C2 | C3 | C4 | B1 | B2 |
|---|---|---|---|---|---|---|
| 3rd |  | ○ |  |  | ○ | ○ |
| 4th (NORMALLY) |  |  |  | ○ | ○ | ○ |

|  | C1 | C2 | C3 | C4 | B1 | B2 |
|---|---|---|---|---|---|---|
| 2nd | ○ |  |  |  | ○ | ○ |
| 4th (NORMALLY) |  |  |  | ○ | ○ | ○ |

|  | C1 | C2 | C3 | C4 | B1 | B2 |
|---|---|---|---|---|---|---|
| 1st | ○ | ○ |  |  |  | ○ |
| 4th |  | ○ |  | ○ |  | ○ |

FIG. 10

⟨ SUB PATTERN ⟩

|  | C1 | C2 | C3 | C4 | B1 | B2 |
|---|---|---|---|---|---|---|
| 8th |  |  | ○ | ○ | ○ |  |
| 4th |  |  | ○ | ○ |  | ○ |

|  | C1 | C2 | C3 | C4 | B1 | B2 |
|---|---|---|---|---|---|---|
| 7th | ○ |  | ○ | ○ |  |  |
| 4th |  |  | ○ | ○ |  | ○ |

|  | C1 | C2 | C3 | C4 | B1 | B2 |
|---|---|---|---|---|---|---|
| 6th | ○ |  |  | ○ | ○ |  |
| 4th | ○ |  |  | ○ |  | ○ |

|  | C1 | C2 | C3 | C4 | B1 | B2 |
|---|---|---|---|---|---|---|
| 5th |  | ○ |  | ○ | ○ |  |
| 4th |  | ○ |  | ○ |  | ○ |

|  | C1 | C2 | C3 | C4 | B1 | B2 |
|---|---|---|---|---|---|---|
| 3rd |  | ○ |  |  | ○ | ○ |
| 4th |  | ○ |  | ○ |  | ○ |

|  | C1 | C2 | C3 | C4 | B1 | B2 |
|---|---|---|---|---|---|---|
| 2nd | ○ |  |  |  | ○ | ○ |
| 4th | ○ |  |  | ○ |  | ○ |

|  | C1 | C2 | C3 | C4 | B1 | B2 |
|---|---|---|---|---|---|---|
| 1st | ○ | ○ |  |  |  | ○ |
| 4th | ○ |  |  | ○ |  | ○ |

CONTROL DEVICE FOR AUTOMATIC TRANSMISSION

BACKGROUND

The present disclosure relates to a control device for an automatic transmission capable of establishing a multiplicity of shift speeds by changing the power transfer path of a speed change gear mechanism using engagement elements such as clutches and brakes, and particularly to shifting to a predetermined shift speed for which there are present a plurality of combinations (patterns) of engagement elements to be engaged.

There has hitherto been devised a multi-stage automatic transmission that establishes ten forward speeds and one reverse speed by changing the power transfer path using four clutches and two brakes by combining a simple planetary gear and a dual planetary gear with a common carrier and two simple planetary gears (U.S. Pat. No. 8,096,915).

The multi-stage automatic transmission with ten forward speeds, for example, may require engagement/disengagement operation of a multiplicity of engagement elements, such as disengagement of two elements followed by engagement of two elements or disengagement of three elements followed by engagement of three elements, depending on the shift (gear) speeds before and after shifting.

SUMMARY

In the case where jumping shifting from a predetermined shift speed is made in the multi-stage automatic transmission, engagement/disengagement operation of a multiplicity of engagement elements is often required, which makes control complicated to degrade the responsiveness or occasionally involves a shifting pattern that makes shifting difficult.

For example, it is necessary to disengage two clutches and engage two brakes to make shifting from a seventh speed to a fourth speed, and it is necessary to engage two clutches and disengage one clutch and one brake to make shifting from a fifth speed to the seventh speed.

An exemplary aspect of the present disclosure provides a control device for an automatic transmission that addresses the foregoing issue, by facilitate shifting to a predetermined shift speed, for which there are a plurality of combinations of engagement elements, by selecting engagement elements for the predetermined shift speed in accordance with a pre-shifting shift speed.

The present disclosure according to an exemplary aspect provides a power transfer device that includes an automatic transmission that includes a plurality of engagement elements and a speed change gear mechanism capable of establishing a multiplicity of shift speeds by changing a power transfer path by engaging or disengaging the engagement elements; and a control device that is configured to control the automatic transmission, wherein: the speed change gear mechanism includes a plurality of combinations of engagement elements to be engaged in order to establish an identical predetermined shift speed; and when shifting is made to the predetermined shift speed by the control device controlling the automatic transmission, a change is made among the combinations of engagement elements for the predetermined shift speed in accordance with a pre-shifting shift speed.

With the control device for an automatic transmission, when shifting is made to a predetermined shift speed which can be established by a plurality of combinations of engagement elements to be engaged, engagement elements for the predetermined shift speed can be selected as appropriate in accordance with the pre-shifting shift speed such that shifting can be made to the predetermined shift speed by interchanging the respective engagement states of two elements, for example, which enables shifting to be made easily and with high responsiveness.

BRIEF DESCRIPTION OF THE DRAWINGS

FIG. 2 is a basic engagement table illustrating the standard engagement relationship of engagement elements of an automatic transmission.

FIG. 6 is an engagement table according to the embodiment.

FIG. 7 is an engagement table for a main pattern indicating shifting from each shift speed to a seventh speed according to the embodiment.

FIG. 8 is an engagement table for a sub pattern indicating shifting from each shift speed to the seventh speed according to the embodiment.

FIG. 9 is an engagement table for a main pattern indicating shifting from each shift speed to a fourth speed according to the embodiment.

FIG. 10 is an engagement table for a sub pattern indicating shifting from each shift speed to the fourth speed according to the embodiment.

DETAILED DESCRIPTION OF EMBODIMENTS

Figure 1:
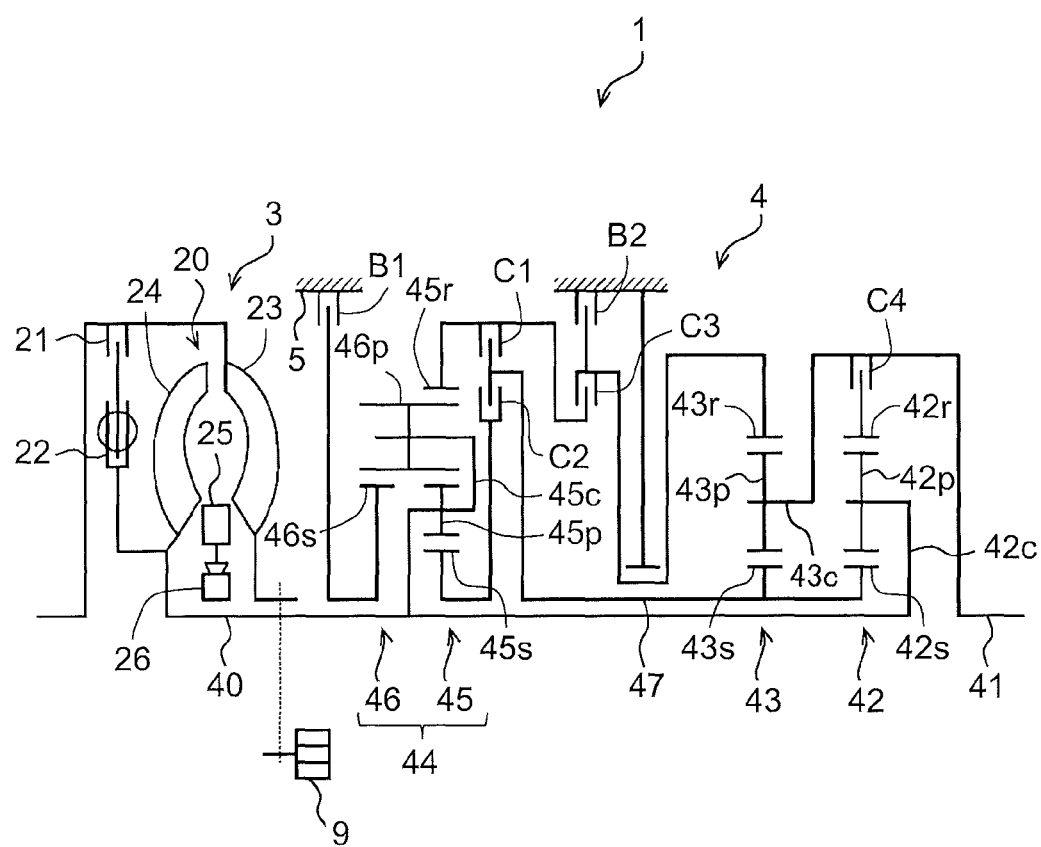
FIG. 1 is a schematic (skeleton) diagram illustrating the entire power transfer device.

A control device for an automatic transmission according to an embodiment will be described below with reference to the drawings. First, a schematic configuration of a power transfer device 1 to which a multi-stage automatic transmission according to the embodiment may be applied will be described with reference to FIGS. 1 to 3. The power transfer device 1 according to the embodiment is connected to a crankshaft of an engine (internal combustion engine; not illustrated) or a rotor of an electric motor that serves as a drive source longitudinally mounted in the front portion of a rear-drive vehicle, and can transfer power (torque) from the engine or the like to left and right rear wheels (drive wheels; not illustrated). The power transfer device 1 includes: a starting device (fluid transmission apparatus) 3; an oil pump 9; an automatic transmission 4 that transfers power transferred from the engine or the like to an input shaft (input member, second coupling member) 40 to an output shaft (output member) 41 with the speed of the power changed; and a transmission case (case) 5 that houses such components.

The starting device 3 includes: a torque converter 20; a lock-up clutch 21 that can connect and disconnect a front cover coupled to the crankshaft of the engine or the like and the input shaft 40 of the automatic transmission 4 to and from each other; and a damper mechanism 22 that damps vibration between the front cover and the input shaft 40 of the automatic transmission 4. The torque converter 20 includes: a pump impeller 23 on the input side coupled to the front cover; a turbine runner 24 on the output side coupled to the input shaft 40 of the automatic transmission 4; a stator 25 disposed on the inner side of the pump impeller 23 and the turbine runner 24 to rectify a flow of working oil from the turbine runner 24 to the pump impeller 23; and a one-way clutch 26 that is supported by a stator shaft (not illustrated) and that restricts the rotational direction of the stator 25 to one direction. The torque converter 20 may be a fluid coupling that does not have the stator 25.

The oil pump 9 is constituted as a gear pump that has: a pump assembly that includes a pump body and a pump cover; an externally toothed gear (inner rotor) coupled to the pump impeller 23 of the torque converter 20 via a chain or a gear train; an internally toothed gear (outer rotor) meshed with the externally toothed gear; and so forth. The oil pump 9 is driven by power from the engine or the like to suction working oil (ATF) reserved in an oil pan (not illustrated) and pump the working oil to a hydraulic control device 51 (see FIG. 4).

The automatic transmission 4 is constituted as a 10-speed transmission, and includes a speed change gear mechanism constituted of: the input shaft 40; the output shaft 41 which is coupled to the left and right rear wheels via a differential gear and a drive shaft (not illustrated); a first planetary gear 42 and a second planetary gear 43 of a single pinion type disposed side by side in the axial direction of the input shaft 40 and the output shaft 41; and a Ravigneaux type planetary gear mechanism (composite planetary gear mechanism) 44 that serves as a composite planetary gear mechanism constituted by combining a double-pinion planetary gear and a single-pinion planetary gear with each other. In addition, the automatic transmission 4 includes a first clutch C1, a second clutch C2, a third clutch C3, a fourth clutch C4, a first brake B1, and a second brake B2 as six friction engagement elements (engagement elements) that change the power transfer path from the input shaft 40 to the output shaft 41.

In the embodiment, the first and second planetary gears 42 and 43 and the Ravigneaux type planetary gear mechanism 44 are disposed in the transmission case 5 so as to be arranged in the order of the Ravigneaux type planetary gear mechanism 44, the second planetary gear 43, and the first planetary gear 42 from the starting device 3 side, that is, the engine side (the left side in FIG. 1). Consequently, the Ravigneaux type planetary gear mechanism 44 is disposed on the front portion side of the vehicle in proximity to the starting device 3, the first planetary gear 42 is disposed on the rear portion side of the vehicle in proximity to the output shaft 41, and the second planetary gear 43 is disposed between the Ravigneaux type planetary gear mechanism 44 and the first planetary gear 42.

The first planetary gear 42 includes: a first sun gear (first rotary element) 42s which is an externally toothed gear; a first ring gear (third rotary element) 42r which is an internally toothed gear disposed concentrically with the first sun gear 42s; a plurality of first pinion gears 42p meshed with the first sun gear 42s and the first ring gear 42r; and a first carrier (second rotary element) 42c that rotatably holds the plurality of first pinion gears 42p. In the embodiment, a gear ratio λ1 of the first planetary gear 42 (the number of teeth of the first sun gear 42s/the number of teeth of the first ring gear 42r) is determined as λ1=0.277, for example.

The first carrier 42c of the first planetary gear 42 is always coupled (fixed) to the input shaft 40. Consequently, when power is transferred from the engine or the like to the input shaft 40, power from the engine or the like is always transferred to the first carrier 42c via the input shaft 40. The first carrier 42c functions as an input element of the first planetary gear 42. In addition, the first ring gear 42r functions as an output element of the first planetary gear 42 when the fourth clutch C4 is engaged.

The second planetary gear 43 includes: a second sun gear (first rotary element) 43s which is an externally toothed gear; a second ring gear (third rotary element) 43r which is an internally toothed gear disposed concentrically with the second sun gear 43s; a plurality of second pinion gears 43p respectively meshed with the second sun gear 43s and the second ring gear 43r; and a second carrier (second rotary element) 43c that rotatably holds the plurality of second pinion gears 43p. In the embodiment, a gear ratio λ2 of the second planetary gear 43 (the number of teeth of the second sun gear 43s/the number of teeth of the second ring gear 43r) is determined as λ2=0.244, for example.

The second sun gear 43s of the second planetary gear 43 is integrated with (always coupled to) the first sun gear 42s of the first planetary gear 42 via an intermediate shaft (first coupling member) 47, and rotated and stopped always together with (and coaxially with) the first sun gear 42s. It should be noted, however, that the first sun gear 42s and the second sun gear 43s may be constituted separately from each other and always coupled to each other via a coupling member (not illustrated). In addition, the second carrier 43c of the second planetary gear 43 is always coupled to the output shaft 41, and rotated and stopped always together with (and coaxially with) the output shaft 41. Consequently, the second carrier 43c functions as an output element of the second planetary gear 43. Furthermore, the second ring gear 43r of the second planetary gear 43 can be held stationary to the transmission case 5 by the second brake B2, and functions as a fixable element of the second planetary gear 43.

The Ravigneaux type planetary gear mechanism 44 is a composite planetary gear mechanism constituted by combining a third planetary gear 45, which is a double-pinion planetary gear, and a fourth planetary gear 46, which is a single-pinion planetary gear, with each other. The planetary gears are disposed in the transmission case 5 so as to be arranged in the order of the fourth planetary gear 46, the third planetary gear 45, the second planetary gear 43, and the first planetary gear 42 from the engine side.

The Ravigneaux type planetary gear mechanism 44 includes: a third sun gear (first rotary element) 45s and a fourth sun gear (first rotary element) 46s which are each an externally toothed gear; a third ring gear (third rotary element) 45r which is an internally toothed gear disposed concentrically with the third and fourth sun gears 45s and 46s; a plurality of third pinion gears (short pinion gears) 45p meshed with the third sun gear 45s; a plurality of fourth pinion gears (long pinion gears) 46p meshed with the fourth sun gear 46s and the plurality of third pinion gears 45p and meshed with the third ring gear 45r; and a third carrier (second rotary element) 45c that rotatably holds the plurality of third pinion gears 45p and the plurality of fourth pinion gears 46p.

The third planetary gear 45 is composed of the third sun gear 45s, the third carrier 45c, the third pinion gears 45p, the fourth pinion gears 46p, and the third ring gear 45r. The fourth planetary gear 46 is composed of the fourth sun gear 46s, the third carrier 45c, the fourth pinion gears 46p, and the third ring gear 45r. In the embodiment, the Ravigneaux type planetary gear mechanism 44 is configured such that a gear ratio λ3 of the third planetary gear 45 (the number of teeth of the third sun gear 45s/the number of teeth of the third ring gear 45r) is determined as λ3=0.488, for example, and a gear ratio λ4 of the fourth planetary gear 46 (the number of teeth of the fourth sun gear 46s/the number of teeth of the third ring gear 45r) is determined as λ4=0.581, for example.

In addition, the Ravigneaux type planetary gear mechanism 44 is composed of four rotary elements, namely the third sun gear 45s, the third carrier 45c, the third ring gear 45r, and the fourth sun gear 46s. Of the four rotary elements, the fourth sun gear 46s can be held stationary by the first brake B1, and functions as a fixable element of the Ravigneaux type planetary gear mechanism 44. Furthermore, the third carrier 45c is always coupled (fixed) to the input shaft 40, and always coupled to the first carrier 42c of the first planetary gear 42. Consequently, when power is transferred from the engine or the like to the input shaft 40, power from the engine or the like is always transferred to the third carrier 45c via the input shaft 40. Thus, the third carrier 45c functions as an input element of the Ravigneaux type planetary gear mechanism 44. In addition, the third ring gear 45r can be coupled to the second sun gear 43s of the second planetary gear 43 and the first sun gear 42s of the first planetary gear 42 via the first clutch C1 and the intermediate shaft 47, can be coupled to the second ring gear 43r of the second planetary gear 43 via the third clutch C3, and functions as a first output element of the Ravigneaux type planetary gear mechanism 44. The third sun gear 45s can be coupled to the second sun gear 43s of the second planetary gear 43 and the first sun gear 42s of the first planetary gear 42 via the second clutch C2 and the intermediate shaft 47, and functions as a second output element of the Ravigneaux type planetary gear mechanism 44.

The first clutch C1 connects and disconnects the first sun gear 42s of the first planetary gear 42 and the second sun gear 43s of the second planetary gear 43, which are always coupled to each other, and the third ring gear 45r of the Ravigneaux type planetary gear mechanism 44 to and from each other. The second clutch C2 connects and disconnects the first sun gear 42s of the first planetary gear 42 and the second sun gear 43s of the second planetary gear 43, which are always coupled to each other, and the third sun gear 45s of the Ravigneaux type planetary gear mechanism 44 to and from each other. The third clutch C3 connects and disconnects the second ring gear 43r of the second planetary gear 43 and the third ring gear 45r of the Ravigneaux type planetary gear mechanism 44 to and from each other. The fourth clutch C4 connects and disconnects the first ring gear 42r of the first planetary gear 42 and the output shaft 41 to and from each other.

The first brake B1 holds (connects) the fourth sun gear 46s of the Ravigneaux type planetary gear mechanism 44 stationary to the transmission case 5 such that the fourth sun gear 46s cannot rotate, and disengages the fourth sun gear 46s from the transmission case such that the fourth sun gear 46s can rotate. The second brake B2 holds (connects) the second ring gear 43r of the second planetary gear 43 stationary to the transmission case 5 such that the second ring gear 43r cannot rotate, and disengages the second ring gear 43r from the transmission case such that the second ring gear 43r can rotate.

In the embodiment, a multi-plate friction-type hydraulic clutch is adopted as the first clutch C1 to the fourth clutch C4. The multi-plate friction-type hydraulic clutch has a piston, a plurality of friction engagement plates (e.g. a friction plate constituted by affixing a friction material to both surfaces of an annular member, and a separator plate which is an annular member with both surfaces formed to be smooth), and a hydraulic servo constituted of an engagement oil chamber, a centrifugal hydraulic pressure cancellation chamber, etc. to each of which working oil is supplied. Meanwhile, a multi-plate friction-type hydraulic brake is adopted as the first brake B1 and the second brake B2. The multi-plate friction-type hydraulic brake has a piston, a plurality of friction engagement plates (a friction plate and a separator plate), and a hydraulic servo constituted of an engagement oil chamber etc. to which working oil is supplied.

FIG. 2 is a basic engagement table illustrating the standard relationship between each shift speed of the automatic transmission 4 and the respective operating states of the first clutch C1 to the fourth clutch C4 and the first brake B1 and the second brake B2. In addition, FIG. 3 is a velocity diagram illustrating the ratio of the rotational speed of each rotary element to the rotational speed of the input shaft 40 of the automatic transmission 4 (note that the rotational speed of the input shaft 40, that is, the first carrier 42c and the third carrier 45c, is defined as a value of 1).

Figure 3:
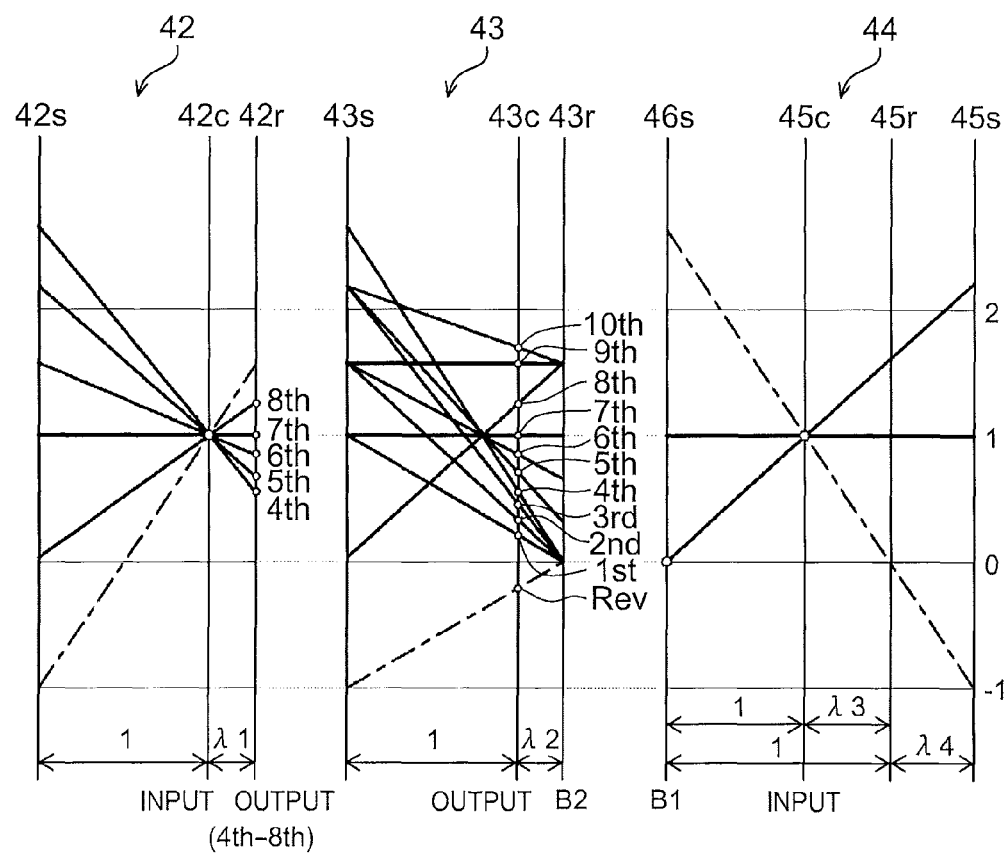
FIG. 3 is a velocity diagram therefor.

As illustrated in FIG. 3, the three rotary elements which constitute the single-pinion first planetary gear 42, that is, the first sun gear 42s, the first ring gear 42r, and the first carrier 42c, are arranged, on the velocity diagram for the first planetary gear 42 (the velocity diagram on the left side in FIG. 3), in the order of the first sun gear 42s, the first carrier 42c, and the first ring gear 42r from the left side of the drawing at intervals that match the gear ratio $\lambda 1$. In the embodiment, according to the order of arrangement on the velocity diagram, the first sun gear 42s is defined as the first rotary element of the automatic transmission 4, the first carrier 42c is defined as the second rotary element of the automatic transmission 4, and the first ring gear 42r is defined as the third rotary element of the automatic transmission 4. Thus, the first planetary gear 42 has the first rotary element, the second rotary element, and the third rotary element of the automatic transmission 4 which are arranged sequentially at intervals that match the gear ratio $\lambda 1$ on the velocity diagram.

In addition, the three rotary elements which constitute the single-pinion second planetary gear 43, that is, the second sun gear 43s, the second ring gear 43r, and the second carrier 43c, are arranged, on the velocity diagram for the second planetary gear 43 (the velocity diagram at the middle in FIG. 3), in the order of the second sun gear 43s, the second carrier 43c, and the second ring gear 43r from the left side of the drawing at intervals that match the gear ratio $\lambda 2$. In the embodiment, according to the order of arrangement on the velocity diagram, the second sun gear 43s is defined as the fourth rotary element of the automatic transmission 4, the second carrier 43c is defined as the fifth rotary element of the automatic transmission 4, and the second ring gear 43r is defined as the sixth rotary element of the automatic transmission 4. Thus, the second planetary gear 43 has the fourth rotary element, the fifth rotary element, and the sixth rotary element of the automatic transmission 4 which are arranged sequentially at intervals that match the gear ratio $\lambda 2$ on the velocity diagram.

Furthermore, the four rotary elements which constitute the Ravigneaux type planetary gear mechanism 44, that is, the fourth sun gear 46s, the third carrier 45c, the third ring gear 45r, and the third sun gear 45s, are arranged, on the velocity diagram for the Ravigneaux type planetary gear mechanism 44 (the velocity diagram on the right side in FIG. 3), in the order of the fourth sun gear 46s, the third carrier 45c, the third ring gear 45r, and the third sun gear 45s from the left side of the drawing at intervals that match the gear ratio $\lambda 3$ of the single-pinion third planetary gear 45 and the gear ratio $\lambda 4$ of the double-pinion fourth planetary gear 46. In the embodiment, according to the order of arrangement on the velocity diagram, the fourth sun gear 46s is defined as the seventh rotary element of the automatic transmission 4, the third carrier 45c is defined as the eighth rotary element of the automatic transmission 4, the third ring gear 45r is defined as the ninth rotary element of the automatic transmission 4, and the third sun gear 45s is defined as the tenth rotary element of the automatic transmission 4. Thus, the Ravigneaux type planetary gear mechanism 44 has the seventh rotary element, the eighth rotary element, the ninth rotary element, and the tenth rotary element of the automatic transmission 4 which are arranged sequentially at intervals that match the gear ratios λ3 and λ4 on the velocity diagram.

Figure 4:
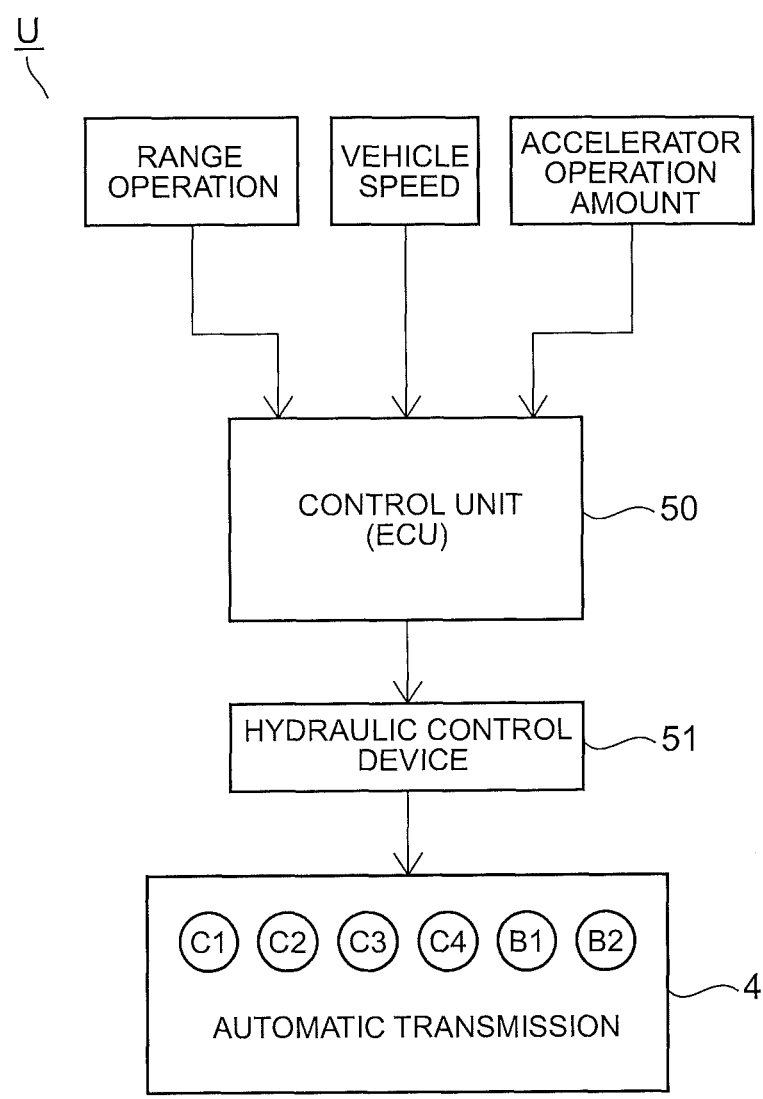
FIG. 4 is a schematic diagram illustrating a control unit and a hydraulic control device.
Figure 5:
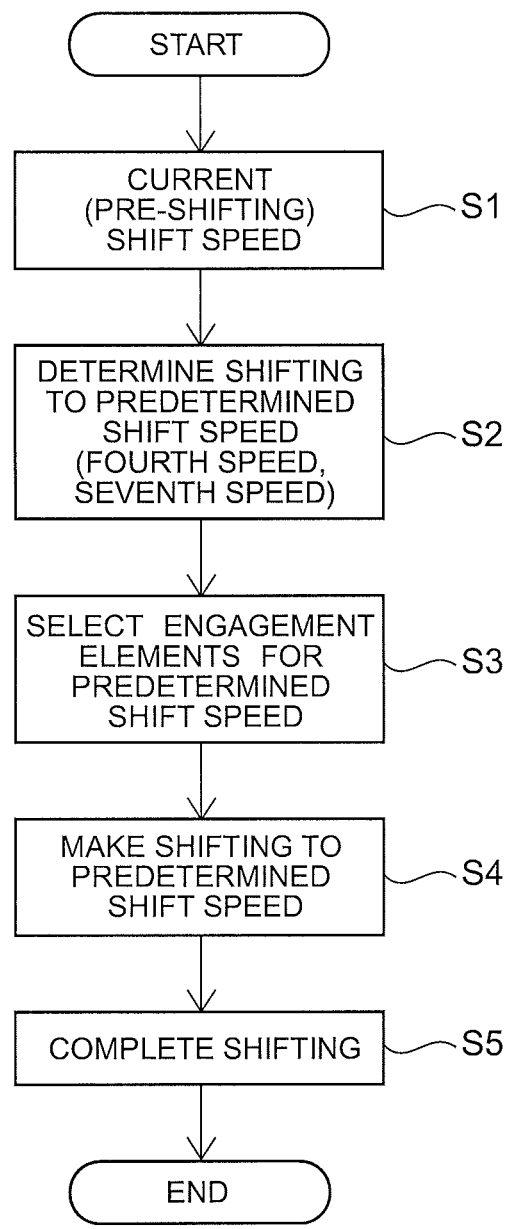
FIG. 5 is a flowchart illustrating essential portions of an embodiment.

As illustrated in FIG. 4, a control device U for the automatic transmission 4 includes a (electronic) control unit (ECU) 50 that receives various signals such as a range operation by a driver, the vehicle speed, and an accelerator operation amount which indicates a request for torque by the driver to output a control signal, and the hydraulic control device 51 which has a multiplicity of valves such as linear solenoid valves. The control unit 50 determines a shift speed in accordance with the signals, and outputs a hydraulic pressure control signal to each of the linear solenoid valves of the hydraulic control device 51. The hydraulic control device 51 outputs a hydraulic pressure regulated in accordance with the hydraulic pressure control signal to hydraulic servos for the clutches C1, C2, C3, and C4 and the brakes B1 and B2 of the automatic transmission 4.

In the automatic transmission 4 configured as described above, the first clutch C1 to the fourth clutch C4 and the first brake B1 and the second brake B2 illustrated in the skeleton diagram of FIG. 1 are engaged and disengaged in combinations indicated in the basic engagement table of FIG. 2 to establish one of a first forward speed (1st) to a tenth forward speed (10th) and a first reverse speed (Rev) with the rotational speed ratio indicated in the velocity diagram of FIG. 3.

Next, the control device for an automatic transmission according to the embodiment will be described with reference to FIGS. 5 to 10 in relation to shifting to a predetermined shift speed (the fourth speed and the seventh speed) as an essential portion of the embodiment. First, the basic flow will be described with reference to FIG. 5.

The control unit 50 recognizes what shift speed (pre-shifting shift speed) is currently established in the automatic transmission 4 (step S1). When the control unit 50 determines shifting to a predetermined shift speed (e.g. the fourth speed or the seventh speed), which can be established with a plurality of combinations of engagement elements to be engaged, in accordance with the vehicle speed and the accelerator operation amount (step S2), the control unit 50 selects a combination of engagement elements that requires a smaller number of engagement elements to be switched when switching is made from engagement elements for establishing the pre-shifting shift speed to engagement elements for establishing the predetermined shift speed in accordance with the combination of the pre-shifting shift speed and the predetermined shift speed (step S3). Then, shifting operation to the predetermined shift speed is performed using the selected engagement elements (step S4) to complete shifting to the predetermined shift speed (step S5). The steps S2 and S3 constitute a determiner for selecting a combination of engagement elements for the predetermined shift speed in accordance with the pre-shifting shift speed on the basis of determination of shifting to the predetermined shift speed which can be established with a plurality of combinations of engagement elements to be engaged.

In the automatic transmission 4, as illustrated in FIG. 6, the fourth shift speed is established by engaging the fourth clutch C4, the second brake B2, and any one of the other elements, namely the first clutch C1, the second clutch C2, the third clutch C3, and the first brake B1 (see the black circles). Meanwhile, the seventh forward speed, which is a direct coupling speed with which the input shaft 40 and the output shaft 41 are rotated at the same speed, is established by engaging at least three of the four clutches (see the double circles). That is, the seventh speed, with which the rotational speed of the input shaft 40 and the rotational speed of the output shaft 41 coincide with each other, is established by engaging any three of the first clutch C1, the second clutch C2, the third clutch C3, and the fourth clutch C4 so that the first planetary gear 42, the second planetary gear 43, and the Ravigneaux type planetary gear mechanism 44 are rotated together with each other. The seventh speed is also established when all of the first to fourth clutches C1, C2, C3, and C4 are engaged. Thus, in the automatic transmission 4, the fourth speed and the seventh speed each corresponds to the predetermined shift speed which can be established with a plurality of combinations of engagement elements to be engaged.

When the seventh speed is established, basically as illustrated in FIG. 2, the first clutch C1, the third clutch C3, and the fourth clutch C4 are engaged, and the other engagement elements C2, B1, and B2 are disengaged. Consequently, an upshift and a downshift to an adjacent shift speed can be made easily by interchanging the respective engagement states of two elements. That is, 7-6 shifting can be made easily by disengaging the third clutch C3 and engaging the first brake B1, and 7-8 shifting can be made easily by disengaging the first clutch C1 and engaging the first brake B1.

FIG. 7 indicates the engagement relationship for shifting from each shift speed to the seventh speed according to the embodiment. In 10-7 shifting, the seventh speed, with the second clutch C2, the third clutch C3, and the fourth clutch C4 engaged, is established by engaging the fourth clutch C4 and disengaging the first brake B1 from the state in which the tenth speed, with the second clutch C2, the third clutch C3, and the first brake B1 engaged, is established. This makes it possible to keep the second clutch C2 engaged, and eliminates the need to engage the first clutch C1 compared to the basic pattern, which facilitates shifting operation.

9-7 shifting is made by engaging the fourth clutch C4 and disengaging the first brake B1. 9-7 shifting is made by interchanging the respective engagement states of two elements as in the basic pattern. 8-7 shifting and 6-7 shifting are also made by interchanging the respective engagement states of two elements as discussed above as in the basic pattern. 4-7 shifting cannot be made by interchanging the respective engagement states of two elements with the fourth speed according to the basic pattern (with the fourth clutch C4, the first brake B1, and the second brake B2 engaged), and is made using the fourth speed with an engagement relationship that is different from the basic engagement table to be discussed later, and will be described with reference to FIG. 9. Meanwhile, 3-7 shifting requires engaging the third clutch C3 and the fourth clutch C4 and disengaging the first brake B1 although the second clutch C2 can be engaged for both the third speed and the seventh speed, and cannot be made (achieved) by interchanging the respective engagement states of two elements. 2-7 shifting also cannot be achieved by interchanging the respective engagement states of two elements.

In 5-7 shifting, the seventh speed, with the first clutch C1, the second clutch C2, and the fourth clutch C4 engaged, is established by engaging the first clutch C1 and disengaging the first brake B1 from the state in which the fifth speed, with the second clutch C2, the fourth clutch C4, and the first brake B1 engaged, is established. This makes it possible to keep the second clutch C2 and the fourth clutch C4 engaged, and eliminates the need to disengage the second clutch C2 and engage the third clutch C3 in accordance with the basic pattern, which facilitates shifting by interchanging the respective engagement states of two elements.

In 1-7 shifting, the seventh speed, with the first clutch C1, the second clutch C2, and the fourth clutch C4 engaged, is established by engaging the fourth clutch C4 and disengaging the second brake B2 from the state in which the first speed, with the first clutch C1, the second clutch C2, and the second brake B2 engaged, is established. This makes it possible to keep the first clutch C1 and the second clutch C2 engaged, and eliminates the need to disengage the second clutch C2 and engage the third clutch C3 in accordance with the basic pattern, which facilitates shifting by interchanging the respective engagement states of two elements.

The main pattern indicated in FIG. 7 gives a priority to engaging the fourth clutch C4. This is because the fourth clutch C4 is kept in the engaged state from the fourth speed to the eighth speed, which facilitates shifting operation from the seventh speed to the other shift speeds. In the case where the fourth clutch C4 is engaged when the pre-shifting shift speed is established, a priority is given to a clutch with low torque sensitivity with a wide chamber area of the hydraulic servo or the like. With the low torque sensitivity, good controllability can be obtained, and a speed change shock can be suppressed.

FIG. 8 also indicates an engagement table for shifting operation to the seventh speed, but according to a sub pattern unlike FIG. 7. In 10-7 shifting, the seventh speed, with the first clutch C1, the second clutch C2, and the third clutch C3 engaged, is established by engaging the first clutch C1 and disengaging the first brake B1 from the state in which the tenth speed, with the second clutch C2, the third clutch C3, and the first brake B1 engaged, is established. 10-7 shifting can also be made easily by interchanging the respective engagement states of two elements with the second clutch C2 kept engaged for both the tenth speed and the seventh speed. In 9-7 shifting, the seventh speed, with the first clutch C1, the second clutch C2, and the third clutch C3 engaged, is established by engaging the second clutch C2 and disengaging the first brake B1 from the state in which the ninth speed, with the first clutch C1, the third clutch C3, and the first brake B1 engaged, is established. Also in this case, shifting can be made easily by interchanging the respective engagement states of two elements.

In 8-7 shifting, the seventh speed, with the second clutch C2, the third clutch C3, and the fourth clutch C4 engaged, is established by engaging the second clutch C2 and disengaging the first brake B1 from the state in which the eighth speed, with the third clutch C3, the fourth clutch C4, and the first brake B1 engaged, is established. Also in this case, shifting can be made easily in the same manner by interchanging the respective engagement states of two elements. In 6-7 shifting, the seventh speed, with the first clutch C1, the second clutch C2, and the fourth clutch C4 engaged, is established by engaging the second clutch C2 and disengaging the first brake B1 from the state in which the sixth speed, with the first clutch C1, the fourth clutch C4, and the first brake B1 engaged, is established. Also in this case, shifting can be made easily in the same manner by interchanging the respective engagement states of two elements.

In 5-7 shifting, the seventh speed, with the second clutch C2, the third clutch C3, and the fourth clutch C4 engaged, is established by engaging the third clutch C3 and disengaging the first brake B1 from the state in which the fifth speed, with the second clutch C2, the fourth clutch C4, and the first brake B1 engaged, is established. Also in this case, shifting can be made easily in the same manner by interchanging the respective engagement states of two elements.

4-7 shifting uses engagement different from the basic pattern for the fourth speed, and thus will be discussed later with reference to FIG. 10. 3-7 shifting and 2-7 shifting cannot be achieved by interchanging the respective engagement states of two elements as in FIG. 7. In 1-7 shifting, the seventh speed, with the first clutch C1, the second clutch C2, and the third clutch C3 engaged, is established by engaging the third clutch C3 and disengaging the second brake B2 from the state in which the first speed, with the first clutch C1, the second clutch C2, and the second brake B2 engaged, is established. Also in this case, shifting can be made easily in the same manner by interchanging the respective engagement states of two elements.

In the basic pattern for the fourth forward speed which is a predetermined shift speed, as illustrated in FIG. 2, the fourth clutch C4, the first brake B1, and the second brake B2 are engaged, and the other engagement elements C1, C2, and C3 are disengaged. Shifting patterns from each shift speed to the fourth speed according to the embodiment are indicated in FIGS. 9 and 10. FIG. 9 indicates main patterns that give a priority to a clutch with low torque sensitivity, and FIG. 10 indicates sub patterns. For the clutch with low torque sensitivity, good controllability can be obtained, and a speed change shock can be suppressed.

In FIGS. 9 and 10, 10-4 shifting and 9-4 shifting cannot be made (achieved) by interchanging the respective engagement states of two elements. First, the main pattern will be described with reference to FIG. 9. In 8-4 shifting, the fourth speed, with the fourth clutch C4, the first brake B1, and the second brake B2 engaged, is established by disengaging the third clutch C3 and engaging the second brake B2 from the state in which the eighth speed, with the third clutch C3, the fourth clutch C4, and the first brake B1 engaged, is established. The shifting pattern is the same as the basic pattern (engagement table), but shifting can be made easily by interchanging the respective engagement states of two elements.

In 7-4 shifting, the fourth speed, with the first clutch C1, the fourth clutch C4, and the second brake B2 engaged, is established by disengaging the third clutch C3 and engaging the second brake B2 from the state in which the seventh speed, with the first clutch C1, the third clutch C3, and the fourth clutch C4 engaged, is established. Consequently, shifting operation can be performed easily with the first clutch C1 kept in the engaged state and with the first brake B1 kept in the disengaged state in accordance with this shifting pattern which only requires interchanging the respective engagement states of two elements, compared to the basic pattern which requires interchanging the respective engagement states of the first clutch C1 and the first brake B1. In the other way, 4-7 shifting can also be made easily by interchanging the respective engagement states of two elements by engaging the third clutch C3 and disengaging the second brake B2 from the state in which the fourth speed, with the first clutch C1, the fourth clutch C4, and the second brake B2 engaged, is established.

In 6-4 shifting, the fourth speed, with the fourth clutch C4, the first brake B1, and the second brake B2 engaged, is established by disengaging the first clutch C1 and engaging the second brake B2 from the state in which the sixth speed, with the first clutch C1, the fourth clutch C4, and the first brake B1 engaged, is established. The shifting pattern is the same as the basic shifting pattern, but shifting can be made easily by interchanging the respective engagement states of two elements. In 5-4 shifting, the fourth speed, with the fourth clutch C4, the first brake B1, and the second brake B2 engaged, is established by disengaging the second clutch C2 and engaging the second brake B2 from the state in which the fifth speed, with the second clutch C2, the fourth clutch C4, and the first brake B1 engaged, is established. Also in this case, the shifting pattern is the same as the basic pattern, but shifting can be made easily by interchanging the respective engagement states of two elements. In 3-4 shifting, the fourth speed, with the fourth clutch C4, the first brake B1, and the second brake B2 engaged, is established by disengaging the second clutch C2 and engaging the fourth clutch C4 from the state in which the third speed, with the second clutch C2, the first brake B1, and the second brake B2 engaged, is established. The shifting pattern is also the same as the basic pattern, but shifting can be made easily by interchanging the respective engagement states of two elements. In 2-4 shifting, the fourth speed, with the fourth clutch C4, the first brake B1, and the second brake B2 engaged, is established by disengaging the first clutch C1 and engaging the fourth clutch C4 from the state in which the second speed, with the first clutch C1, the first brake B1, and the second brake B2 engaged, is established. The shifting pattern is also the same as the basic pattern, but shifting can be made easily by interchanging the respective engagement states of two elements.

In 1-4 shifting, the fourth speed, with the second clutch C2, the fourth clutch C4, and the second brake B2 engaged, is established by disengaging the first clutch C1 and engaging the fourth clutch C4 from the state in which the first speed, with the first clutch C1, the second clutch C2, and the second brake B2 engaged, is established. This makes it possible to keep the second clutch C2 engaged, and eliminates the need to disengage the second clutch C2 and engage the first brake B1 as required in accordance with the basic pattern, which enables shifting operation by interchanging the respective engagement states of two elements.

Shifting to the fourth speed according to the sub pattern will be described with reference to FIG. 10. In 8-4 shifting, the fourth speed, with the third clutch C3, the fourth clutch C4, and the second brake B2 engaged, is established by disengaging the first brake B1 and engaging the second brake B2 from the state in which the eighth speed, with the third clutch C3, the fourth clutch C4, and the first brake B1 engaged, is established. Also in this case, shifting can be made easily by interchanging the respective engagement states of two elements.

In 7-4 shifting, the fourth speed, with the third clutch C3, the fourth clutch C4, and the second brake B2 engaged, is established by disengaging the first clutch C1 and engaging the second brake B2 from the state in which the seventh speed, with the first clutch C1, the third clutch C3, and the fourth clutch C4 engaged, is established. Also in this case, shifting can be made easily by interchanging the respective engagement states of two elements. Also in 4-7 shifting, the seventh speed, with the first clutch C1, the third clutch C3, and the fourth clutch C4 engaged, is established by engaging the first clutch C1 and disengaging the second brake B2 from the state in which the fourth speed, with the third clutch C3, the fourth clutch C4, and the second brake B2 engaged, is established. Also in this case, shifting can be made easily in the same manner by interchanging the respective engagement states of two elements.

In 6-4 shifting, the fourth speed, with the first clutch C1, the fourth clutch C4, and the second brake B2 engaged, is established by disengaging the first brake B1 and engaging the second brake B2 from the state in which the sixth speed, with the first clutch C1, the fourth clutch C4, and the first brake B1 engaged, is established. Also in this case, shifting can be made easily in the same manner by interchanging the respective engagement states of two elements. In 5-4 shifting, the fourth speed, with the second clutch C2, the fourth clutch C4, and the second brake B2 engaged, is established by disengaging the first brake B1 and engaging the second brake B2 from the state in which the fifth speed, with the second clutch C2, the fourth clutch C4, and the first brake B1 engaged, is established. Also in this case, shifting can be made easily in the same manner by interchanging the respective engagement states of two elements.

In 3-4 shifting, the fourth speed, with the second clutch C2, the fourth clutch C4, and the second brake B2 engaged, is established by engaging the fourth clutch C4 and disengaging the first brake B1 from the state in which the third speed, with the second clutch C2, the first brake B1, and the second brake B2 engaged, is established. Also in this case, shifting can be made easily in the same manner by interchanging the respective engagement states of two elements.

In 2-4 shifting, the fourth speed, with the first clutch C1, the fourth clutch C4, and the second brake B2 engaged, is established by engaging the fourth clutch C4 and disengaging the first brake B1 from the state in which the second speed, with the first clutch C1, the first brake B1, and the second brake B2 engaged, is established. Also in this case, shifting can be made easily in the same manner by interchanging the respective engagement states of two elements. In 1-4 shifting, the fourth speed, with the first clutch C1, the fourth clutch C4, and the second brake B2 engaged, is established by disengaging the second clutch C2 and engaging the fourth clutch C4 from the state in which the first speed, with the first clutch C1, the second clutch C2, and the second brake B2 engaged, is established. Also in this case, shifting can be made easily in the same manner by interchanging the respective engagement states of two elements.

In the control device U for the automatic transmission 4 according to the embodiment, as discussed above, when shifting is made to a predetermined shift speed (the fourth speed and the seventh speed) which can be established by a plurality of combinations of a plurality of engagement elements including the first to fourth clutches C1 to C4 and the first and second brakes B1 and B2, engagement elements for the predetermined shift speed can be selected as appropriate in accordance with the pre-shifting shift speed so that shifting can be made to the predetermined shift speed by interchanging the respective engagement states of two elements. Consequently, shifting to the predetermined shift speed can be made easily and with high responsiveness.

In the control device U for the automatic transmission 4 according to the embodiment, in addition, the speed change gear mechanism has a first combination for establishing the predetermined shift speed in the case where shifting is made from a first shift speed, which is different from the predetermined shift speed, to the predetermined shift speed, and a second combination for establishing the predetermined shift speed in the case where shifting is made from a second shift speed, which is different from the predetermined shift speed, to the predetermined shift speed, the second combination being different from the first combination. That is, the speed change gear mechanism has a first combination constituted of the first clutch C1, the third clutch C3, and the fourth clutch C4 for establishing the seventh speed in the case where shifting is made from the eighth speed, which corresponds to the first shift speed, to the seventh speed, and a second combination constituted of the first clutch C1, the second clutch C2, and the fourth clutch C4 for establishing the seventh speed in the case where shifting is made from the first speed to the seventh speed, for example, the second combination being different from the first combination.

Consequently, with the control device U for the automatic transmission 4, there are present a plurality of combinations of engagement elements for establishing one predetermined shift speed so that different combinations can be selected in accordance with from what shift speed shifting is made to the predetermined shift speed.

In the control device U for the automatic transmission 4 according to the embodiment, in addition, a combination with which one engagement element is disengaged and another engagement element is engaged in order to make shifting from the pre-shifting shift speed to the predetermined shift speed is selected from the plurality of combinations of engagement elements to be engaged to establish the predetermined shift speed. For example, a combination with which the first brake B1, which corresponds to one engagement element, is disengaged and the third clutch C3, which corresponds to another engagement element, is engaged in order to make shifting from the sixth speed, which is established by engaging the first clutch C1, the fourth clutch C4, and the first brake B1, to the seventh speed is selected. That is, a combination with which a smaller number of engagement elements are engaged or disengaged in order to make shifting from the pre-shifting shift speed to the predetermined shift speed is selected.

Consequently, with the control device U for the automatic transmission 4, a combination that minimizes the number of engagement elements to be engaged or disengaged in order to make shifting from the pre-shifting shift speed to the predetermined shift speed is selected. Thus, shifting to the predetermined shift speed can be made easily and with high responsiveness.

In the control device U for the automatic transmission 4 according to the embodiment, in addition, the engagement elements are constituted of four clutches and two brakes; and the predetermined shift speed (fourth speed) is established by engaging one clutch and one brake and engaging any one of the remaining three clutches and one brake. Consequently, an adequate combination of engagement elements can be selected from a wide variety of choices.

In the control device U for the automatic transmission 4 according to the embodiment, in addition, the engagement elements are constituted of four clutches and two brakes; and the predetermined shift speed (seventh speed) is established by engaging at least any three of the four clutches. Consequently, shifting can be made from a multiplicity of shift speeds by interchanging the respective engagement states of a small number of engagement elements.

In the control device U for the automatic transmission 4 according to the embodiment, in addition, the speed change gear mechanism includes first to fourth planetary gears 42, 43, 45, and 46, an input shaft 40, and an output shaft 41; the engagement elements are constituted of first to fourth clutches C1 to C4 and first and second brakes B1 and B2; the first planetary gear 42 has a first sun gear 42s, a first carrier 42c that can be coupled to the input shaft 40, and a first ring gear 42r; the second planetary gear 43 has a second sun gear 43s, a second carrier 43c coupled to the output shaft 41, and a second ring gear 43r; the fourth clutch C4 is coupled to any one of the first sun gear 42s, the first carrier 42c, and the first ring gear 42r; the second brake B2 is coupled to the second ring gear 43r; the first clutch C1, the second clutch C2, and the third clutch C3 can transfer power between the first planetary gear 42 and the second planetary gear 43 and the third planetary gear 45 and the fourth planetary gear 46; and the first brake B1 is coupled to a rotary element of any one of the third planetary gear 45 and the fourth planetary gear 46.

In the embodiment, the fourth clutch C4 is coupled to the first ring gear 42r. However, the present disclosure is not limited thereto, and the fourth clutch C4 may be coupled to the first sun gear 42s or the first carrier 42c, for example.

In the control device U for the automatic transmission 4 according to the embodiment, in addition, the speed change gear mechanism includes first to fourth planetary gears 42, 43, 45, and 46, an input shaft 40, and an output shaft 41; the engagement elements are constituted of first to fourth clutches C1 to C4 and first and second brakes B1 and B2; the first planetary gear 42 has a first sun gear 42s, a first carrier 42c coupled to the input shaft 40, and a first ring gear 42r; the second planetary gear 43 has a second sun gear 43s, a second carrier 43c coupled to the output shaft 41, and a second ring gear 43r; the fourth clutch C4 can couple any one of the first sun gear 42s, the first carrier 42c, and the first ring gear 42r and any one of the second sun gear 43s, the second carrier 43c, and the second ring gear 43r to each other; the second brake B2 is coupled to the second ring gear 43r; the first clutch C1, the second clutch C2, and the third clutch C3 can transfer power between the first planetary gear 42 and the second planetary gear 43 and the third planetary gear 45 and the fourth planetary gear 46; and the first brake B1 is coupled to a rotary element of any one of the third planetary gear 45 and the fourth planetary gear 46.

In the embodiment, the fourth clutch C4 can couple the first ring gear 42r and the second carrier 43c to each other. However, the present disclosure is not limited thereto, and the fourth clutch C4 may be able to couple the first sun gear 42s and the second sun gear 43s to each other, or may be able to couple the first carrier 42c and the input shaft 40 to each other, for example.

In the control device U for the automatic transmission 4 according to the embodiment, in addition, the speed change gear mechanism includes first to fourth planetary gears 42, 43, 45, and 46, an input shaft 40, and an output shaft 41; the engagement elements are constituted of first to fourth clutches C1 to C4 and first and second brakes B1 and B2; the first planetary gear 42 has a first sun gear 42s, a first carrier 42c coupled to the input shaft 40, and a first ring gear 42r; the second planetary gear 43 has a second sun gear 43s coupled to the first sun gear 42s, a second carrier 43c coupled to the output shaft 41, and a second ring gear 43r; the fourth clutch C4 can couple the first ring gear 42r and the second carrier 43c to each other; the second brake B2 is coupled to the second ring gear 43r; the first clutch C1, the second clutch C2, and the third clutch C3 can transfer power between the first planetary gear 42 and the second planetary gear 43 and the third planetary gear 45 and the fourth planetary gear 46; and the first brake B1 is coupled to a rotary element of any one of the third planetary gear 45 and the fourth planetary gear 46.

In the control device U for the automatic transmission 4 according to the embodiment, in addition, the speed change gear mechanism includes a transmission case 5, an input shaft 40, an output shaft 41, first and second planetary gears 42 and 43 each having first to third rotary elements, a Ravigneaux type planetary gear mechanism 44 constituted by combining third and fourth planetary gears 45 and 46 with each other and having four rotary elements; an input shaft 40 that couples one of the four rotary elements of the Ravigneaux type planetary gear mechanism 44 and the first carrier 42c of the first planetary gear 42 to each other, and an intermediate shaft 47 that couples the first sun gear 42s of the first planetary gear 42 and the second sun gear 43s of the second planetary gear 43 to each other; and the plurality of engagement elements are constituted of first to fourth clutches C1 to C4 that can couple two of the first to fourth planetary gears 42, 43, 45, and 46 to each other, and first and second brakes B1 and B2 that can couple one of the first to fourth planetary gears 42, 43, 45, and 46 and the transmission case 5 to each other.

In the control device U for the automatic transmission 4 according to the embodiment, in addition, the speed change gear mechanism includes a first planetary gear 42 and a second planetary gear 43 of a single-pinion type and a Ravigneaux type planetary gear mechanism 44 constituted by combining a double-pinion planetary gear 45 and a single-pinion planetary gear 46 with each other; a first carrier 42c of the first planetary gear 42 and a third carrier 45c of the Ravigneaux type planetary gear mechanism 44 are coupled to an input shaft 40, a second carrier 43c of the second planetary gear 43 is coupled to an output shaft 41, and a first sun gear 42s of the first planetary gear 42 and a second sun gear 43s of the second planetary gear 43 are integrally coupled to each other; a first clutch C1 is interposed between the first sun gear 42s and the second sun gear 43s, which are integrally coupled to each other, and a third ring gear 45r of the Ravigneaux type planetary gear mechanism 44, a second clutch C2 is interposed between the first sun gear 42s and the second sun gear 43s, which are integrally coupled to each other, and a third sun gear 45s of the double-pinion planetary gear 45 of the Ravigneaux type planetary gear mechanism 44, a third clutch C3 is interposed between a second ring gear 43r of the second planetary gear 43 and the third ring gear 45r of the Ravigneaux type planetary gear mechanism 44, and a fourth clutch C4 is interposed between a first ring gear 42r of the first planetary gear 42 and the output shaft 41; a fourth sun gear 46s of the single-pinion planetary gear 46 of the Ravigneaux type planetary gear mechanism 44 is coupled to the first brake B1, and the second ring gear 43r is coupled to the second brake B2; and the first clutch C1, the second clutch C2, the third clutch C3, the fourth clutch C4, the first brake B1, and the second brake B2 are engaged or disengaged as appropriate to establish ten forward speeds and one reverse speed.

Consequently, with the control device U for the automatic transmission 4, shifting to the predetermined shift speed can be made reliably and quickly in the multi-stage automatic transmission with ten forward speeds by selecting one of the plurality of combinations of engagement elements to be engaged.

In the control device U for the automatic transmission 4 according to the embodiment, in addition, the predetermined shift speed is a shift speed established by engaging the fourth clutch C4, the second brake B2, and any one of the first clutch C1, the second clutch C2, the third clutch C3, and the first brake B1. Consequently, the fourth speed is established, for example, and adequate shifting can be made easily by selecting a combination from a multiplicity of combinations of engagement elements.

In the control device U for the automatic transmission 4 according to the embodiment, in addition, the predetermined shift speed is a shift speed established by engaging at least any three of the first clutch C1, the second clutch C2, the third clutch C3, and the fourth clutch C4 and with which the first to fourth planetary gears 42, 43, 45, and 46 are rotated together with each other so that a rotational speed of the input shaft 40 and a rotational speed of the output shaft 41 coincide with each other. Consequently, the seventh speed is established, for example, and adequate shifting can be made easily by selecting any three of the four clutches C1 to C4. In addition, the seventh speed is a direct coupling speed, and drag torque can be reduced by directly coupling all the planetary gears by engaging all the four clutches.

The present disclosure is not limited to the automatic transmission 4, and may be equally applied to shifting to a predetermined shift speed that has a plurality of combinations of engagement elements to be engaged.

INDUSTRIAL APPLICABILITY

The control device for an automatic transmission of this disclosure can be used for an automatic transmission that has a speed change gear mechanism that provides a plurality of combinations of engagement elements to be engaged, and is particularly suitable for use for an automatic transmission for which it is desired to make shifting easily and with high responsiveness.

The invention claimed is:

1. A power transfer device comprising:
an automatic transmission that includes a plurality of engagement elements and a speed change gear mechanism capable of establishing a multiplicity of shift speeds by changing a power transfer path by engaging or disengaging the engagement elements; and
a control device that is configured to control the automatic transmission, wherein:
the speed change gear mechanism includes a plurality of combinations of engagement elements to be engaged in order to establish an identical predetermined shift speed;
when shifting is made to the predetermined shift speed by the control device controlling the automatic transmission, a change is made among the combinations of engagement elements for the predetermined shift speed in accordance with a pre-shifting shift speed;
the speed change gear mechanism includes
a case,
an input member,
an output member,
first and second planetary gears each having first to third rotary elements,
a composite planetary gear mechanism formed by combining third and fourth planetary gears with each other and having four rotary elements;
a first coupling member that couples one of the four rotary elements of the composite planetary gear mechanism and the second rotary element of the first planetary gear to each other, and
a second coupling member that couples the first rotary element of the first planetary gear and the first rotary element of the second planetary gear to each other; and
the plurality of engagement elements includes first to fourth clutches that can couple two of the first to fourth planetary gears to each other, and first and second brakes that can couple one of the first to fourth planetary gears and the case to each other.

2. The power transfer device according to claim 1, wherein
the speed change gear mechanism has:
a first combination for establishing the predetermined shift speed when shifting is made from a first shift speed, which is different from the predetermined shift speed, to the predetermined shift speed, and a second combination for establishing the predetermined shift speed when shifting is made from a second shift speed, which is different from the predetermined shift speed, to the predetermined shift speed, the second combination being different from the first combination.

3. The power transfer device according to claim 2, wherein
a combination with which one engagement element is disengaged and another engagement element is engaged in order to make shifting from the pre-shifting shift speed to the predetermined shift speed is selected from the plurality of combinations of engagement elements to be engaged to establish the predetermined shift speed.

4. The power transfer device according to claim 3, wherein:
the predetermined shift speed is established by engaging one clutch and one brake and engaging any one of the remaining three clutches and one brake.

5. The power transfer device according to claim 3, wherein:
the predetermined shift speed is established by engaging at least any three of the four clutches.

6. The power transfer device according to claim 5, wherein:
the first planetary gear has a first sun gear, a first carrier coupled to the input member, and a first ring gear;
the second planetary gear has a second sun gear, a second carrier coupled to the output member, and a second ring gear;
the fourth clutch is coupled to any one of the first sun gear, the first carrier, and the first ring gear;
the second brake is coupled to the second ring gear;
the first clutch, the second clutch, and the third clutch can transfer power between the first planetary gear and the second planetary gear and the third planetary gear and the fourth planetary gear; and
the first brake is coupled to a rotary element of any one of the third planetary gear and the fourth planetary gear.

7. The power transfer device according to claim 5, wherein:
the first planetary gear has a first sun gear, a first carrier coupled to the input member, and a first ring gear;
the second planetary gear has a second sun gear, a second carrier coupled to the output member, and a second ring gear;
the fourth clutch can couple any one of the first sun gear, the first carrier, and the first ring gear and any one of the second sun gear, the second carrier, and the second ring gear to each other;
the second brake is coupled to the second ring gear;
the first clutch, the second clutch, and the third clutch can transfer power between the first planetary gear and the second planetary gear and the third planetary gear and the fourth planetary gear; and
the first brake is coupled to a rotary element of any one of the third planetary gear and the fourth planetary gear.

8. The power transfer device according to claim 5, wherein:
the first planetary gear has a first sun gear, a first carrier coupled to the input member, and a first ring gear;
the second planetary gear has a second sun gear coupled to the first sun gear, a second carrier coupled to the output member, and a second ring gear,
the fourth clutch can couple the first ring gear and the second carrier to each other;

the second brake is coupled to the second ring gear,
the first clutch, the second clutch, and the third clutch can transfer power between the first planetary gear and the second planetary gear and the third planetary gear and the fourth planetary gear; and
the first brake is coupled to a rotary element of any one of the third planetary gear and the fourth planetary gear.

9. The power transfer device according to claim 5, wherein:
the speed change gear mechanism includes the first planetary gear and the second planetary gear of a single-pinion type and a Ravigneaux type planetary gear mechanism formed by combining a double-pinion planetary gear and a single-pinion planetary gear with each other;
a first carrier of the first planetary gear and a third carrier of the Ravigneaux type planetary gear mechanism are coupled to the input member, a second carrier of the second planetary gear is coupled to the output member, and a first sun gear of the first planetary gear and a second sun gear of the second planetary gear are integrally coupled to each other,
a first clutch is interposed between the first sun gear and the second sun gear, which are integrally coupled to each other, and a third ring gear of the Ravigneaux type planetary gear mechanism, a second clutch is interposed between the first sun gear and the second sun gear, which are integrally coupled to each other, and a third sun gear of the double-pinion planetary gear of the Ravigneaux type planetary gear mechanism, a third clutch is interposed between a second ring gear of the second planetary gear and the third ring gear of the Ravigneaux type planetary gear mechanism, and a fourth clutch is interposed between a first ring gear of the first planetary gear and the output member;
a fourth sun gear of the single-pinion planetary gear of the Ravigneaux type planetary gear mechanism is coupled to the first brake, and the second ring gear is coupled to the second brake; and
the first clutch, the second clutch, the third clutch, the fourth clutch, the first brake, and the second brake are engaged or disengaged as appropriate to establish ten forward speeds and one reverse speed.

10. The power transfer device according to claim 2, wherein:
the predetermined shift speed is established by engaging one clutch and one brake and engaging any one of the remaining three clutches and one brake.

11. The power transfer device according to claim 1, wherein:
the speed change gear mechanism includes the first planetary gear and the second planetary gear of a single-pinion type and a Ravigneaux type planetary gear mechanism formed by combining a double-pinion planetary gear and a single-pinion planetary gear with each other;
a first carrier of the first planetary gear and a third carrier of the Ravigneaux type planetary gear mechanism are coupled to the input member, a second carrier of the second planetary gear is coupled to the output member, and a first sun gear of the first planetary gear and a second sun gear of the second planetary gear are integrally coupled to each other;
a first clutch is interposed between the first sun gear and the second sun gear, which are integrally coupled to each other, and a third ring gear of the Ravigneaux type planetary gear mechanism, a second clutch is interposed between the first sun gear and the second sun gear, which are integrally coupled to each other, and a third sun gear of the double-pinion planetary gear of the Ravigneaux type planetary gear mechanism, a third clutch is interposed between a second ring gear of the second planetary gear and the third ring gear of the Ravigneaux type planetary gear mechanism, and a fourth clutch is interposed between a first ring gear of the first planetary gear and the output member;

a fourth sun gear of the single-pinion planetary gear of the Ravigneaux type planetary gear mechanism is coupled to the first brake, and the second ring gear is coupled to the second brake; and the first clutch, the second clutch, the third clutch, the fourth clutch, the first brake, and the second brake are engaged or disengaged as appropriate to establish ten forward speeds and one reverse speed.

12. The power transfer device according to claim 1, wherein a combination with which one engagement element is disengaged and another engagement element is engaged in order to make shifting from the pre-shifting shift speed to the predetermined shift speed is selected from the plurality of combinations of engagement elements to be engaged to establish the predetermined shift speed.

13. The power transfer device according to claim 1, wherein:

the predetermined shift speed is established by engaging one clutch and one brake and engaging any one of the remaining three clutches and one brake.

14. A power transfer device comprising:

an automatic transmission that includes a plurality of engagement elements and a speed change gear mechanism capable of establishing a multiplicity of shift speeds by changing a power transfer path by engaging or disengaging the engagement elements; and a control device that is configured to control the automatic transmission, wherein:

the speed change gear mechanism includes a plurality of combinations of engagement elements to be engaged in order to establish an identical predetermined shift speed;

when shifting is made to the predetermined shift speed by the control device controlling the automatic transmission, a change is made among the combinations of engagement elements for the predetermined shift speed in accordance with a pre-shifting shift speed;

the speed change gear mechanism includes first to fourth planetary gears, an input member, and an output member, the engagement elements includes first to fourth clutches and first and second brakes;

the first planetary gear has a first sun gear, a first carrier coupled to the input member, and a first ring gear;

the second planetary gear has a second sun gear, a second carrier coupled to the output member, and a second ring gear;

the fourth clutch is coupled to any one of the first sun gear, the first carrier, and the first ring gear;

the second brake is coupled to the second ring gear, the first clutch, the second clutch, and the third clutch can transfer power between the first planetary gear and the second planetary gear and the third planetary gear and the fourth planetary gear; and the first brake is coupled to a rotary element of any one of the third planetary gear and the fourth planetary gear.

15. The power transfer device according to claim 14, wherein:

the fourth clutch can couple any one of the first sun gear, the first carrier, and the first ring gear and any one of the second sun gear, the second carrier, and the second ring gear to each other.

16. The power transfer device according to claim 15, wherein:

the second planetary gear has the second sun gear coupled to the first sun gear, the second carrier coupled to the output member, and the second ring gear; and the fourth clutch can couple the first ring gear and the second carrier to each other.

17. The power transfer device according to claim 16, wherein the predetermined shift speed is a shift speed established by engaging the fourth clutch, the second brake, and any one of the first clutch, the second clutch, the third clutch, and the first brake.

18. The power transfer device according to claim 16, wherein the predetermined shift speed is a shift speed established by engaging at least any three of the first clutch, the second clutch, the third clutch, and the fourth clutch and with which the first to fourth planetary gears are rotated together with each other so that a rotational speed of the input member and a rotational speed of the output member coincide with each other.

\* \* \* \* \*